(12) United States Patent
Björkengren et al.

(10) Patent No.: US 7,617,158 B2
(45) Date of Patent: Nov. 10, 2009

(54) SYSTEM AND METHOD FOR DIGITAL RIGHTS MANAGEMENT OF ELECTRONIC CONTENT

(75) Inventors: Ulf Björkengren, Bjärred (SE); Per Ståhl, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 712 days.

(21) Appl. No.: 10/926,689

(22) Filed: Aug. 26, 2004

(65) Prior Publication Data

US 2005/0209972 A1    Sep. 22, 2005

Related U.S. Application Data

(60) Provisional application No. 60/555,250, filed on Mar. 22, 2004.

(51) Int. Cl.
  *G06Q 99/00* (2006.01)
(52) U.S. Cl. .................. 705/51; 380/277; 705/64; 705/71
(58) Field of Classification Search .............. 705/51
  See application file for complete search history.

(56) References Cited

U.S. PATENT DOCUMENTS

| | | | |
|---|---|---|---|
| 6,226,618 B1 * | 5/2001 | Downs et al. ............... | 705/1 |
| 7,190,790 B1 * | 3/2007 | Hill et al. ................. | 380/44 |
| 2002/0094084 A1 | 7/2002 | Wasilewski et al. | |
| 2004/0088541 A1 * | 5/2004 | Messerges et al. ......... | 713/156 |
| 2004/0205333 A1 | 10/2004 | Björkengren | |
| 2005/0008162 A1 * | 1/2005 | Brokenshire et al. ...... | 380/277 |

FOREIGN PATENT DOCUMENTS

| | | | |
|---|---|---|---|
| EP | 1338992 | * | 8/2003 |
| WO | WO 01/78285 A1 | | 10/2001 |

OTHER PUBLICATIONS

Alfred Menezes, Paul Oorschot, Scott Vanstone, "Handbook of Applied Cryptography", 1997, CRC Press LLC, all pp.*

(Continued)

*Primary Examiner*—Andrew J. Fischer
*Assistant Examiner*—Chrystina Zelaskiewicz
(74) *Attorney, Agent, or Firm*—Potomac Patent Group PLLC (57) ABSTRACT

Digital rights management is described involving a device, a content issuer, and a rights issuer. A content encryption key (CEK) is encrypted using a public key associated with the device to produce an encrypted CEK. The encrypted CEK is encrypted using an issuer encryption key to produce a twice encrypted CEK. The twice encrypted CEK is encrypted using the public key to produce a ciphertext included in a rights object. The rights object is available to the device for decrypting digital content associated with the content issuer. The device can then decrypt the rights object ciphertext using its private key to produce a decrypted rights object ciphertext and decrypt the decrypted rights object ciphertext using an issuer decryption key received from the content issuer to produce an encrypted CEK. The encrypted CEK is decrypted using the private key to obtain the CEK, which is then available for decrypting digital content.

30 Claims, 6 Drawing Sheets

OTHER PUBLICATIONS

PCT International Search Report dated Apr. 27, 2005 in connection with International Application No. PCT/EP2005/002147.

PCT Written Opinion dated Apr. 27, 2005 in connection with International Application No. PCT/EP2005/002147.

Open Mobile Alliance, "OMA-Download-DRM-V1_0-20031031-C", Digital Rights Management, Candidate Version 1.0, Oct. 31, 2003. Open Mobile Alliance Ltd., Mountain View, California, United States.

Open Mobile Alliance, "Digital Rights Management Short Paper", Dec. 2003. Open Mobile Alliance Ltd., Mountain View, California, United States.

* cited by examiner

SYSTEM AND METHOD FOR DIGITAL RIGHTS MANAGEMENT OF ELECTRONIC CONTENT

CROSS-REFERENCE TO RELATED APPLICATIONS

This application claims the benefit of U.S. Provisional Application No. 60/555,250, filed Mar. 22, 2004, which is incorporated by reference.

BACKGROUND

The invention relates to electronic content security. More particularly, the invention relates to Digital Rights Management of electronic content.

More and more information is transmitted electronically in digital form. Virtually anything that can be represented by words, numbers, graphics, audio or video information, or a system of commands and instructions can be formatted into electronic digital information, also referred to as "digital content," or just "content." Electronic appliances of various types are all interconnected, providing their users with the potential to accomplish a myriad of tasks, such as telecommunications, financial transactions, business operations, research, and entertainment-related transactions.

A fundamental problem for digital content providers is extending their ability to control the use of proprietary information, such as copyrighted content. Content providers often want to limit the usage of the content to authorized activities and amounts. For example, commercial content providers are concerned with ensuring that they receive appropriate compensation for the use of content.

Content providers and distributors have employed a number of rights protection mechanisms to prevent unauthorized use of their content. Among these is Digital Rights Management (DRM). DRM relates to the licensing and control of the distribution and use of digital content. In general, DRM systems distribute digital content in an encrypted form. A set of rights is associated with the content, and only after acquiring the rights to access a protected piece of digital content will a user be allowed to decrypt it. Currently there are competing DRM specifications, which include Open Mobile Alliance (OMA DRM), Windows Media Device (WM D-DRM), and several others.

DRM content distribution is becoming more widespread as more devices, such as cellular telephones and personal digital assistants (PDAs) become DRM-enabled. According to conventional software architecture, as seen from a high-level system view, the software for the devices is one monolithic piece. For example, some current DRM solutions propose DRM function implementation within the software contained in the handheld device. More particularly, some conventional DRM solutions require the use of a dedicated "DRM player," such as a browser, media player, and the like.

An alternative approach is to divide the software into a platform part, having a platform software domain, which includes fundamental services and software components; and an application part, having an application software domain, which includes software components that are more closely related to specific device features. An example of such a system is described in U.S. patent application Ser. No. 10/413,044, "Method and System for Digital Rights Management," filed Apr. 14, 2003. In the following, it is assumed that a software architecture having platform and application parts is used.

Figure 1:
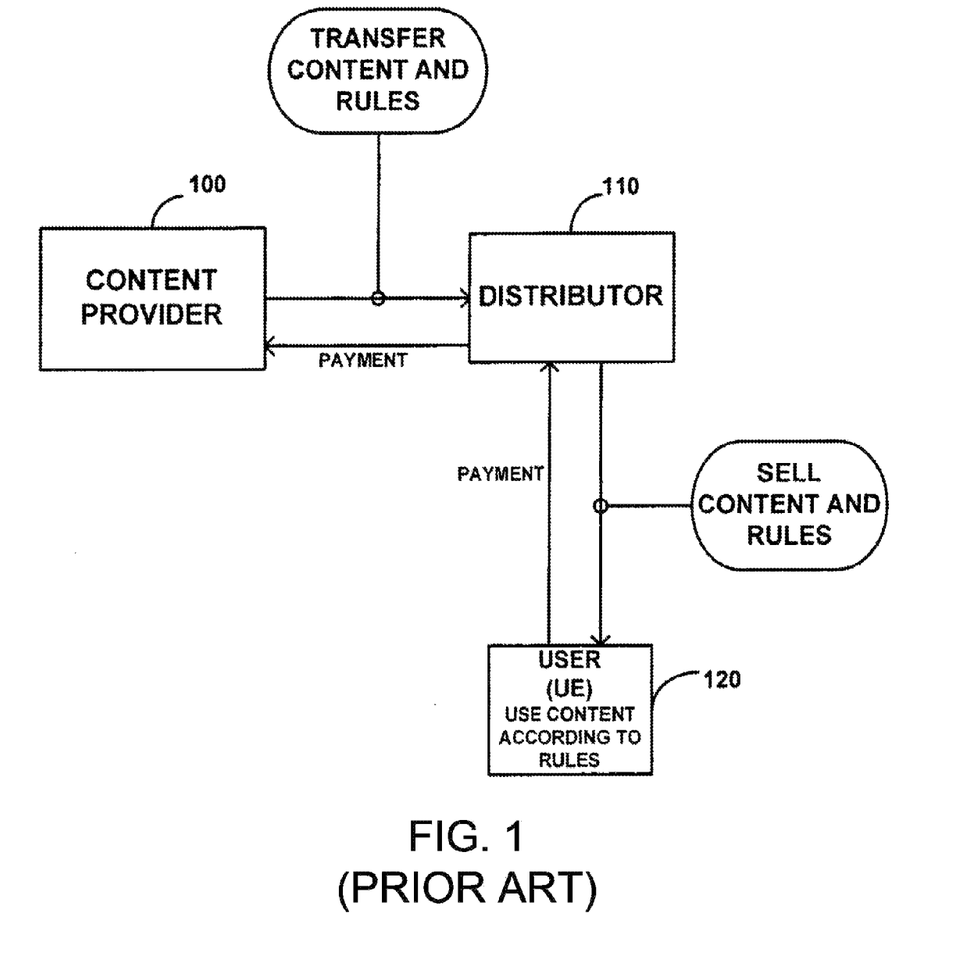
FIG. 1 is a block diagram illustrating a basic model for providing content using DRM.

FIG. 1 illustrates a basic model for providing content using DRM. A content provider 100 creates and packages digital content according to the DRM specification and establishes one or more sets of usage rights (or rules) and associated usage costs, which are associated with the various possible uses of the content (e.g., play, print, copy, distribute, etc.) and the allowable number of times, or time period, that the content is made available. The content is transferred to a distributor 110 that makes it available to users 120, for example on a distributor's storefront website. A user 120, operating user equipment (UE), may then browse the distributor's available content and select content of interest to the user 120, while also selecting one of the defined usage rights for the content (noting the associated usage costs). The user 120 makes the appropriate payment to the distributor 110 for the selected content/usage, at which time the content and usage rights can be transferred to the UE, which may be a mobile terminal, PDA, media player, or other like device capable of rendering content. The UE can then render the content according to the usage rules to make it available for use by the user 120 according to the usage rules. In some cases the rights are cleared through payment to an intermediary (not shown), such as a payment broker, which then signals the distributor 110 to supply the content.

The DRM-related data may be defined generally as two entities—a content container and a license—that can be transferred either as one physical package or as two separate physical packages. The latter case is more flexible since a new license can be obtained without resending the entire content and a higher security level is achieved when content and license are not transferred together. If the content container and license are transferred separately, they each must include linking information.

The content container comprises the actual content that the user wants to render, which is typically in an encrypted form to protect against unauthorized usage. The license generally includes the usage rights of the associated content, e.g., a rights object, and a key, or some or all of the information needed to generate a key, needed for content decryption.

As discussed above, the usage rights define the conditions that apply to the rendering of the content. To allow for flexible and extensible expression of the usage rights, special rights expression languages (REL) have been developed. Two of the dominating REL alternatives today are called extensible rights markup language (XrML) and open digital rights language (ODRL), both of which are based on extensible markup language (XML).

Platforms that support DRM-protected content distribution to the UE include some form of logical DRM component to provide the needed DRM functionality in the platform domain to process the DRM-protected content. For example, the platform for a telecommunications system must provide a logical DRM component to process the DRM-protected content that is made available for download to mobile terminals in the system. In general, the DRM component within the platform must provide DRM functionality support within the platform to an outside application (in the application domain) that is providing content to a UE supported by the platform.

The term platform as used here refers generally to platform software and hardware that at least partially make up a "secure" network in which users communicate, via UEs, either wirelessly or by wire, or a combination of the two. Network entities in the platform may be interfaced to outside applications in the application domain for the purposes of downloading DRM-protected content, among other things. The network is considered secure in the sense that the network platform and its communications traffic are managed and controlled by a network provider.

An example of such a secure network is a telecommunications system, generally comprising UEs (e.g., mobile terminals) communicating wirelessly to base stations, which in turn communicate with other telecommunication network entities and the like. Included among these other entities is an interface to outside networks, such as the Internet, and outside applications. These outside applications are accessible to users within the network via the various network entities and the software they use to communicate and move data to and from the user (i.e., the platform software) under the control of the network provider.

An encryption/decryption algorithm is employed for encrypting and decrypting the content. The algorithm is preferably symmetric, meaning an identical key is used for both operations, for efficiency reasons. The keys themselves, however, can also be protected by using asymmetric ciphering algorithms, which make use of a public/private key pair. Additional security may also be obtained by incorporating the use of certificates and digital signatures, as is known in the art. The complete model for reliable distribution of public keys by using certificates and digital signatures is known as the Public Key Infrastructure (PKI).

The UE decrypts the content using a decryption key supplied in the rights object via the platform. It is often the case that unique keys for decrypting the content must be distributed to each of a large number of UEs. Distributing a large number of keys typically requires a relatively significant amount of time, forcing the key distribution to take place well before the content is made available, e.g., a planned streaming video/audio event, because each distributed key is unique to each UE and the distribution typically follows rather complex protocols specified by the DRM solution. The fact that the key or key material will be available in the UE a long time before its intended usage results in an increased risk that the key will be compromised by unauthorized users and perhaps even widely distributed to other unauthorized users. Therefore the time that a key (or key material) is present on the UE before its intended usage should be minimized. This problem worsens as the amount of bandwidth available for key distribution decreases, since the amount of time needed to distribute the keys increases. Systems such as mobile communication systems are especially vulnerable, due to their limited bandwidth. Other domains, such as the Digital Broadcast (TV) domain, have enough bandwidth to distribute the key only shortly before a streaming content session is to begin.

SUMMARY

A method is disclosed for digital rights management in a system including a device, a content issuer, and a rights issuer. A content encryption key (CEK) is encrypted using a public key associated with the device to produce an encrypted CEK. The encrypted CEK is encrypted using an issuer encryption key that includes data corresponding to the content issuer to produce a twice encrypted CEK. The twice encrypted CEK is encrypted using the public key associated with the device to produce a rights object ciphertext. The rights object ciphertext is available to the device at one point in time, and the issuer decryption key being available to the device at another point in time, both keys being necessary for decrypting digital content associated with the content issuer.

A method for digital rights management at a device includes decrypting a rights object ciphertext received from a rights issuer using a private key associated with the device to produce a decrypted rights object ciphertext and decrypting the decrypted rights object ciphertext using an issuer decryption key received from a content issuer to produce an encrypted CEK. The encrypted CEK is decrypted using the private key associated with the device to obtain a CEK. The CEK is then available for decrypting digital content associated with the content issuer. The rights object ciphertext is available to the device at one point in time and the issuer decryption key being available to the device at another point in time, both keys being necessary for decrypting digital content associated with the content issuer.

A system for digital rights management including a device, a content issuer, and a rights issuer, includes logic that encrypts a content encryption key (CEK) using a public key associated with a device to produce an encrypted CEK and logic that encrypts the encrypted CEK using an issuer encryption key including data corresponding to a content issuer to produce a twice encrypted CEK. The system also includes logic that encrypts the twice encrypted CEK using the public key associated with the device to produce a rights object ciphertext. The rights object ciphertext is available to the device for decrypting digital content associated with the content issuer at one point in time and the issuer decryption key being available to the device at another point in time, both keys being necessary for decrypting digital content associated with the content issuer.

An apparatus for digital rights management includes logic that decrypts a rights object ciphertext received from a rights issuer using a private key associated with the apparatus to produce a decrypted rights object ciphertext and logic that decrypts the decrypted rights object ciphertext using an issuer decryption key received from a content issuer to produce an encrypted CEK. The apparatus also includes logic that decrypts the encrypted CEK using the private key associated with the apparatus to obtain a CEK. The CEK is then available for decrypting digital content associated with the content issuer. The rights object ciphertext is available to the device at one point in time and the issuer decryption key being available to the device at another point in time, both keys being necessary for decrypting digital content associated with the content issuer.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer based system, processor containing system, or other system that can fetch the instructions from a computer readable medium and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

The OMA DRM Specification, V2, proposes that a rights issuer, i.e., an entity that issues rights objects, transmit a rights object containing a content encryption key ("CEK") to a UE (the term "device" is used instead of UE hereinafter for correspondence to OMA DRM terminology) that is encrypted using the device's public key. To be more precise, the content encryption key is encrypted together with the rights (and other sensitive information of the rights object) using a rights object encryption key, and the rights object encryption key is encrypted together with a MAC key (for integrity protection of the rights object) using the device's public key, and the resulting ciphertext is included in the rights object. For simplicity we replace these operations with one encryption operation here. A DRM Agent in the device then uses the device's private key to decrypt the rights object to obtain the CEK that then can be used to decrypt the streaming content. This approach, however, results in an increased risk that the CEK will be compromised by unauthorized users and/or distributed to other unauthorized users. That is, the key can be hacked in advance of the streaming session (e.g., due to a poor DRM implementation at the device), and the compromised CEK can be distributed to a large number of users (e.g., via internet) that can then use it to decrypt the streaming content.

Figure 2:
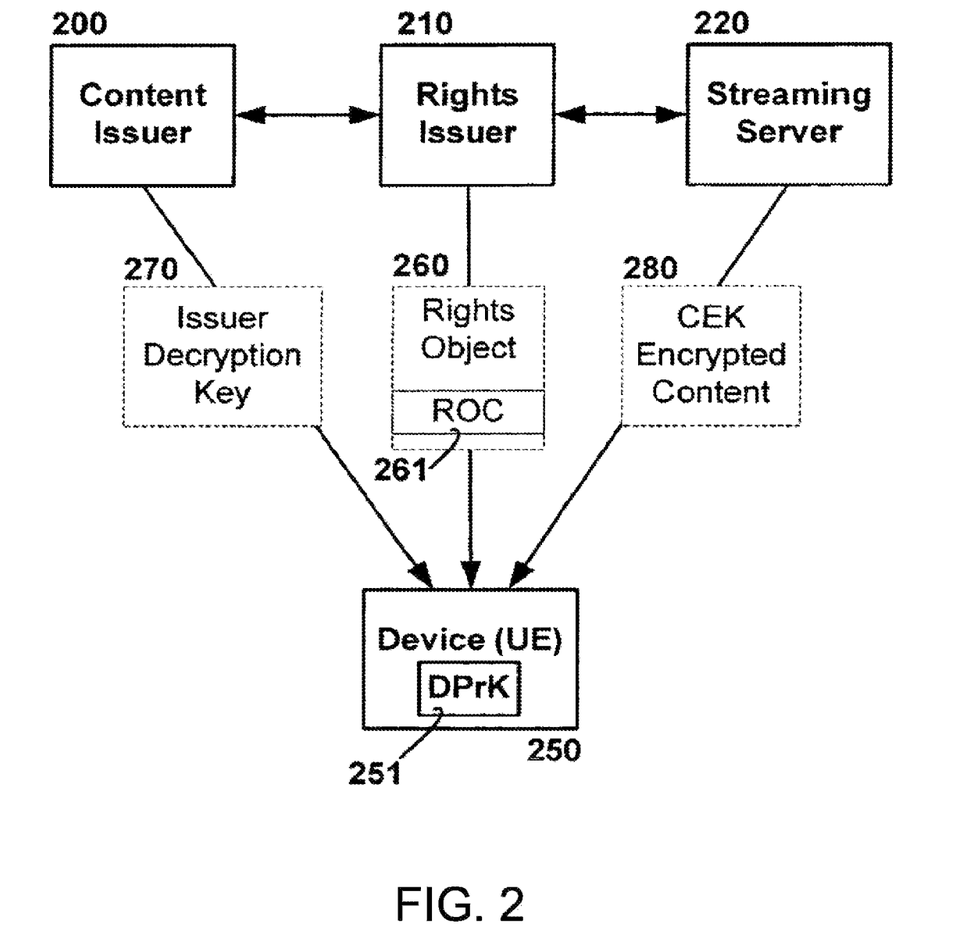
FIG. 2 is a block diagram illustrating content delivery using DRM according to one aspect.

FIG. 2 is a block diagram illustrating content delivery using DRM for a streaming content use case. There are four agents, a content issuer 200, a rights issuer 210, a UE 250, and a streaming server 220. A device 250, that includes a private key ("DPrK") 251, is in this example the intended recipient of content. The content issuer 200, rights issuer 210, and streaming server 220 are logically shown as separate entities, but it will be appreciated that these agents can be combined physically and/or logically. Here, the term agent refers to a software component or routine that performs an action when a specified event occurs. The agent's instructions are carried out via an instruction execution system, apparatus, or device, such as a computer based system, processor containing system, or other system that can fetch instructions and execute the instructions.

The rights issuer 210 forwards a rights object 260 to the device 250 that contains the rights, i.e., permissions and constraints that define the circumstances under which access is granted to DRM content, and a rights object ciphertext 261 that is the encrypted form of the CEK needed to decrypt the DRM content according to the rights. The content issuer 200 forwards an issuer decryption key ("IDK") 270 to the device for use in deriving the CEK (to decrypt the content) from the rights object ciphertext 261. Using this technique, the rights object 260 can be provided well in advance of the content. The CEK, however, cannot be derived until the IDK 270 is received at the device 250. The IDK 270 is not device-unique (can be the same for all devices) and can thus be broadcast to all devices receiving that particular content just before the content is sent. Accordingly, the CEK can only be fully decrypted by the device 250, i.e., is usable at the device 250, shortly before the content is received, which minimizes the time for hacking the CEK in pursuit of unauthorized use. In addition, the rights object ciphertext 261 can be distributed to each device well in advance, even in systems that have limited bandwidth for this purpose, such as a telecommunication system. Once the CEK is derived, CEK-encrypted content 280 that is received by the device 250 from the streaming server 220 can be decrypted and the content rendered by the device 250.

Figure 4:
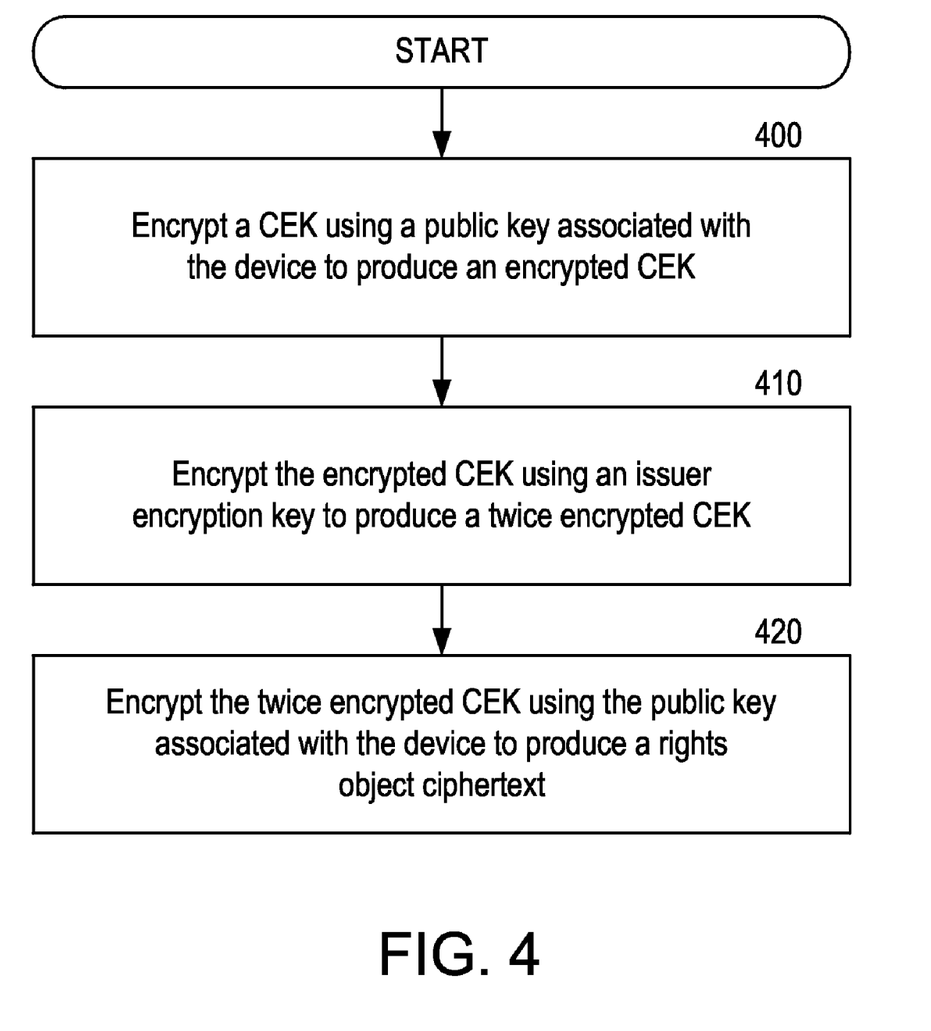
FIG. 4 is a flow chart illustrating a method for DRM according to another aspect.

FIG. 4 is a flow chart illustrating a method for DRM according to another aspect. The CEK is encrypted (400) using a public key ("DPuK") associated with the device 250 to produce an encrypted CEK (CEK"). The encrypted CEK (CEK") is again encrypted (410) using an issuer encryption key that includes data corresponding to the content issuer to produce a twice encrypted CEK (CEK'). Here, the encrypted CEK can be encrypted together with the rights and other "sensitive information.". Such sensitive information could include any other data that would benefit by added integrity and/or confidentiality protection, such as a key for rights object integrity protection. Twice encrypted CEK (CEK') is encrypted (420) using the DPUK to produce the rights object ciphertext 261, which is available to the device 250 for decrypting CEK-encrypted content 280 associated with the content issuer 200.

Figure 6:
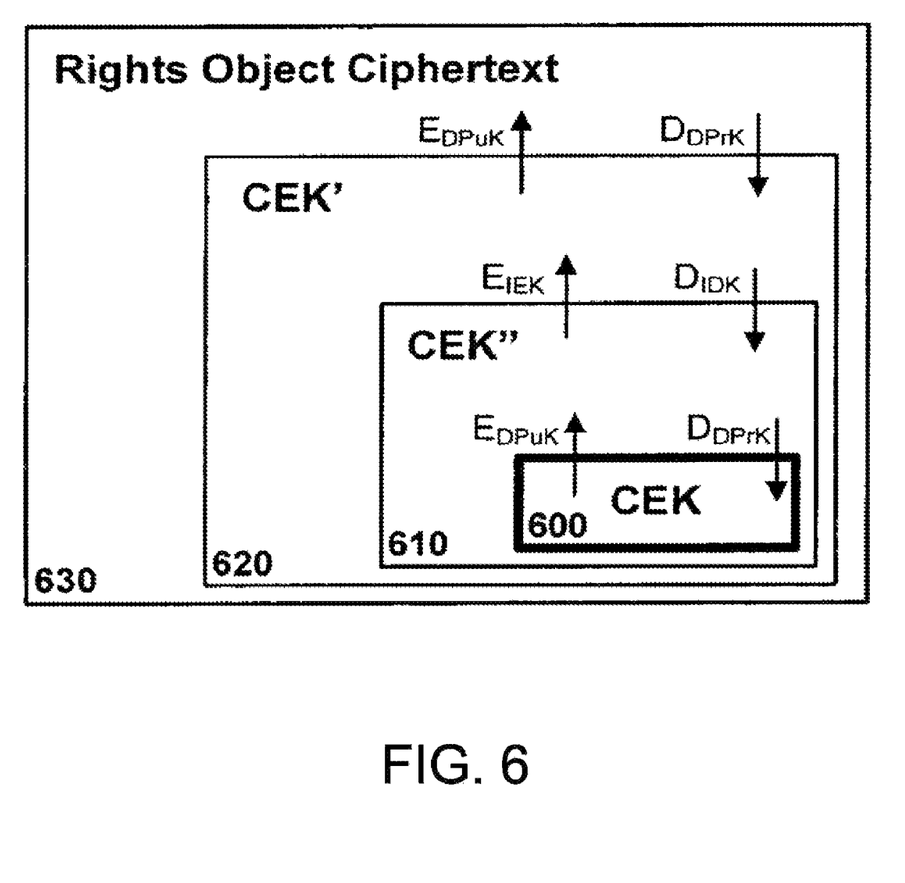
FIG. 6 illustrates the encryption/decryption of the CEK.

The method is performed by the rights issuer 210 alone or in cooperation with the content issuer 200. The rights issuer 210 compiles knowledge of the CEK, the issuer encryption key ("IEK"), and the device-specific DPuK. FIG. 6 illustrates the encryption of the CEK 600. The DPuK is applied to encrypt CEK 600 and produce CEK" 610, i.e., CEK"=$E_{DPuK}$(CEK). In this step, the RSA algorithm could be used. The IEK is applied to encrypt CEK" 610 and produce CEK' 620, i.e., CEK'=$E_{IEK}$(CEK"). Here, the encryption is preferably performed using a symmetric cipher, such as the advanced encryption standard ("AES"). Other symmetric or asymmetric encryption methods may also be employed. If a symmetric cipher is used, then the issuer encryption key equals the issuer decryption key, i.e., IEK=IDK. The DPuK is applied to encrypt CEK' 620 and produce the rights object ciphertext ("ROC") 630, i.e., ROC=$E_{DPuK}$(CEK'). Also, in this step, the RSA algorithm could be used, and this step could involve one or more transformations as, e.g., in OMA DRM V2, mentioned above.

Referring again to FIG. 2, once the rights object ciphertext 261 is produced; it is forwarded with the rights object 260 to the device 250 by the rights issuer 210. This can be forwarded well in advance of the CEK-encrypted content 280, since the device 250 will not be able to decrypt the CEK' 620 until the IDK 270 is received from the content issuer 200. Since the CEK' 620 is device unique and the device private key is needed to obtain the CEK, a hacker must publish both CEK' and his private key via, e.g., the Internet, to let others be able to obtain the CEK when the IDK is broadcast. However, publishing his private key is not something the hacker is likely to want to do. The device's private key is only accessible to the device DRM Agent. UE users or others do not have access to this key.

Figure 3:
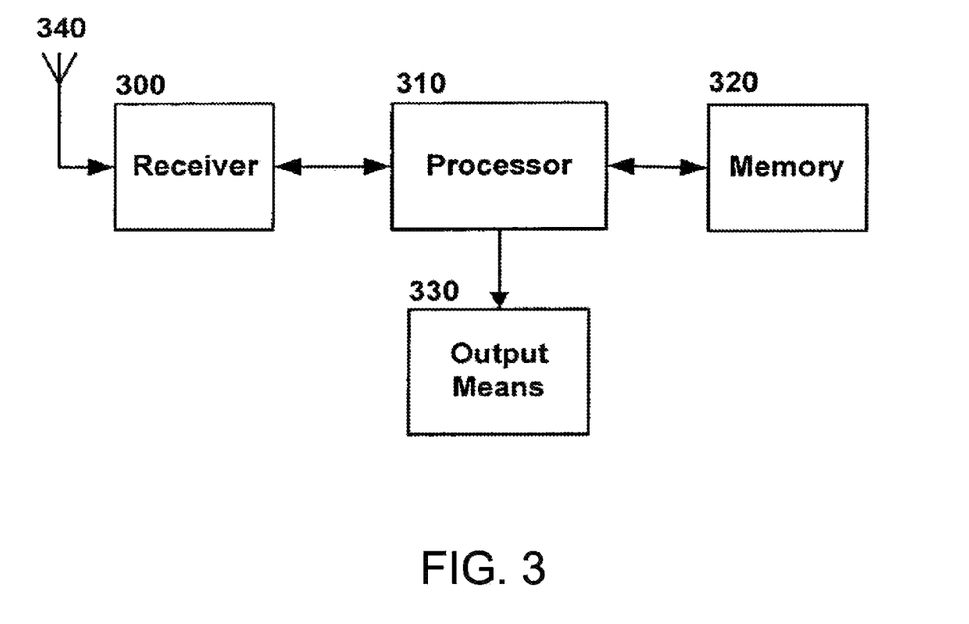
FIG. 3 is a block diagram illustrating a DRM capable device according to another aspect.

FIG. 3 is a block diagram illustrating a DRM capable device. A receiver 300 receives signals either wirelessly via an antenna 340, or through another medium known in the art, such as wire, fiber optic cable, and the like. The receiver 300 converts the received signals to a format that is recognized by a processor 310 for processing the signals. The processor 310 accesses a memory 320, such as RAM, ROM, and the like, to fetch stored instructions and/or information. For example, instructions forming a decryption algorithm and/or decryption keys can be stored in the memory 320 and retrieved by the processor 310 to decrypt content received via the receiver 300. Once the content is decrypted by the processor 310, the content may go through further transformations, such as decompression, and is then forwarded to some output means 330 associated with the device, such as one or more displays and/or speakers.

Figure 5:
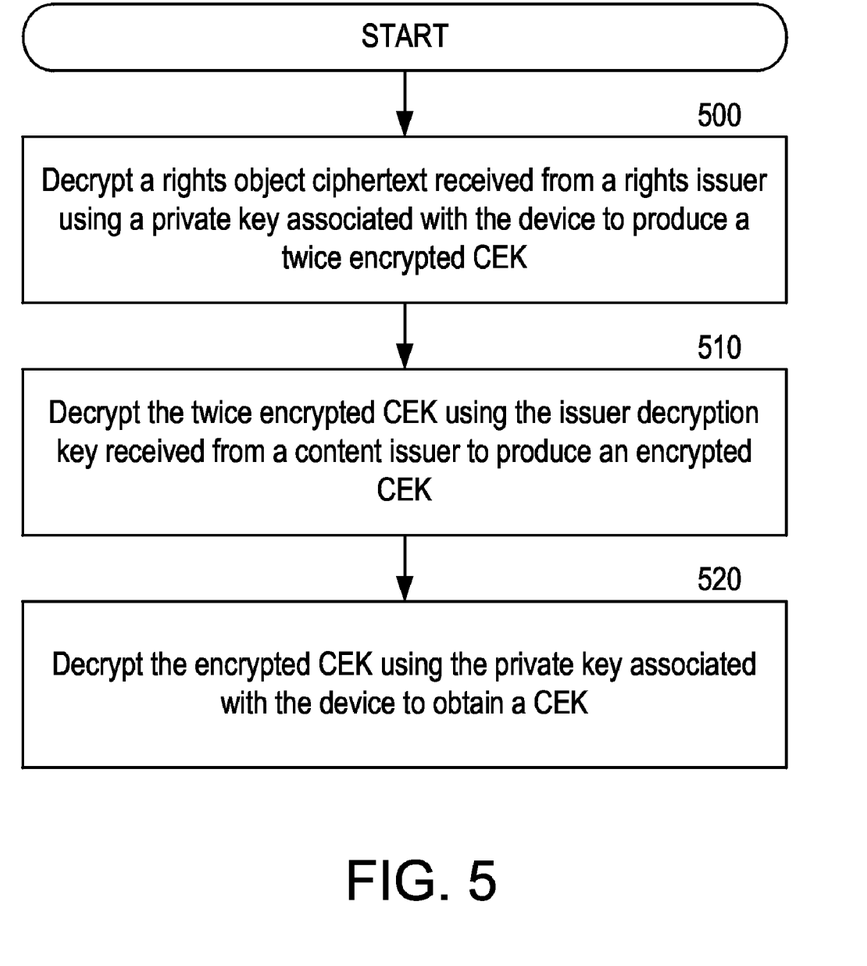
FIG. 5 is a flow chart illustrating a method for DRM at a device according to another aspect.

FIG. 5 is a flow chart illustrating a method for DRM at a device. The rights object ciphertext 261 received from the rights issuer 210 is decrypted (500) using a private key ("DPrK") 251 associated with the device to produce a decrypted rights object ciphertext that includes a twice encrypted CEK (i.e., CEK'). A device's DPrK 251 is only accessible to the device DRM Agent. UE users or others do not have access to this key. The decrypted CEK' is decrypted (510) using the IDK 270 received from the content issuer 200 to produce an encrypted CEK. The encrypted CEK is decrypted (520) using the DPrK 251 to obtain CEK. The CEK is then available for decrypting digital content associated with the content issuer 200. In step 420 of FIG. 4, the CEK is encrypted once more with the device public key DPuK as in step 400 of FIG. 4 which might seem unnecessary. However, the step 420 in FIG. 4 (and step 500 in FIG. 5) corresponds to the encryption of the CEK as described in OMA DRM V2 described above (or a similar scheme), and does not only involve the encryption of the CEK, but other sensitive information of the rights object is also encrypted. This encryption also includes a MAC key used to integrity protect the rights object including the twice encrypted CEK and the rights. As soon as the DRM device receives the rights object from the rights issuer, the rights object ciphertext can be decrypted to check the integrity of the rights object, obtain the CEK', the rights, and other sensitive data from the rights object, etc. The CEK can, however, not be obtained until IDK 270 arrives.

FIG. 6 also illustrates the decryption of a rights object ciphertext 630 at the device 250, using the DPrK 251 at the device 250, e.g., via a DRM agent associated with the device 250. The rights object ciphertext 630 is decrypted using the DPrK 251 to produce CEK' 620, i.e., CEK'=$D_{DPrK}$(ROC). This could involve one or more transformations. CEK' 620 is decrypted using the IDK 270 to produce CEK" 610, i.e., CEK"=$D_{IDK}$(CEK'). Here, the decryption is preferably performed using a symmetric cipher, such as AES. Other symmetric or asymmetric encryption/decryption methods may also be employed. CEK" 610 is decrypted using the DPrK 251 to produce CEK 600, i.e., CEK=$D_{DPrK}$(CEK").

As can be appreciated, the steps illustrated by FIG. 5 are inverse to the steps illustrated by FIG. 4, and any level of symmetry can be employed such that one or more of the ciphers in one operation have to be used in the respective opposite operation also.

Once the CEK is produced at the device 250, the digital content, i.e., the CEK-encrypted content 280, associated with the content issuer 200 can be received from the streaming server 220 and decrypted using the CEK 600.

Since the IDK 270 is not device specific, the same IDK 270 can be forwarded to a plurality of devices. Accordingly, the IDK 270 can be "broadcast" to all devices receiving the content in a relatively short time even using limited bandwidth, such as is available in a telecommunications system. Consequently, the IDK 270 can be forwarded to and received at the device 250 as an initial part of the digital content 280 or just prior to the device 250 receiving the digital content 280. For example, the IDK 270 could be selected so that it is also the initial value used in the encryption of the digital content 280.

The IDK 270 may also optionally be digitally signed prior to being forwarded to the device 250. For example, the content issuer 200 or rights issuer 210 can digitally sign the IDK 270 using a private key to ensure that the IDK 270 does not get modified during transmission to the device 250. The DRM agent at the device 250 verifies the signature using the corresponding public key, which then must be made available to the device 250. In OMA DRM V2, the rights issuer's public key is already delivered to the device during the rights issuer registration phase and is used to authenticate the rights issuer 210. Accordingly, the rights issuer key pair can be used for signing the IDK 270 with minimal impact on the current OMA DRM V2 infrastructure.

Applicants described methods, systems, and apparatus significantly reduce the risk of unauthorized use due to hacking the CEK. Moreover, there is an added benefit of improved scalability to large numbers of devices 250.

The IDK 270 can be forwarded along with other data used for other purposes in the device 250. As long as the other data is not device unique, the scalability and broadcast benefits will be maintained. The device 250 would simply extract the IDK 270 from the other data before using it.

It should be appreciated that the term "key" as used in the description and claims includes not only encryption/decryption keys, but also data or information that can be used to generate one or more encryption/decryption keys. To further increase the security against the threat that the CEK is published on the Internet by a hacker at the time when the streaming session starts and that a user could obtain the CEK and then only miss the first part of the streamed content, the content encryption key could be changed (key refreshment) during the streaming session. The scheme is then extended to involve a set of content encryption keys {CEK1, CEK2, ..., CEKn} and a set of issuer encryption keys (IEK1, IEK2, ..., IEKn). Each CEKi is encrypted using the device public key to generate CEKi". Each CEKi" is then encrypted with different issuer encryption keys IEKi into CEKi'. CEK1', ..., CEKn' are then concatenated and encrypted and included in the RO using the same encryption as used for a single CEK' as described above. When the RO is obtained by the DRM device, the RO ciphertext can be decrypted to obtain CEK1', ..., CEKn'. The issuer decryption keys (IDK1, ..., IDKn) will be sent out periodically just before changing the content encryption key during streaming such that when IDKi is obtained the DRM agent can calculate CEKi as described above.

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

It should be emphasized that the terms "comprises" and "comprising", when used in this description and claims, are taken to specify the presence of stated features, steps, or components, but the use of these terms does not preclude the presence or addition of one or more other features, steps, components, or groups thereof.

What is claimed is:

1. A method for digital rights management performed in a system supporting digital rights management wherein the system supporting digital rights management includes system components comprising a device, a content issuer, and a rights issuer, the method for digital rights management comprising:
a system hardware component other than the device performing:
encrypting a content encryption key (CEK) using a public key associated with the device to produce an encrypted CEK;
encrypting the encrypted CEK using an issuer encryption key to produce a twice encrypted CEK, wherein the issuer encryption key includes data corresponding to the content issuer;
producing a rights object ciphertext by encrypting the twice encrypted CEK and integrity check information using the public key associated with the device, wherein the integrity check information is for integrity checking a rights object;
providing the rights object ciphertext with the rights object to the device at a first point in time; and
providing an issuer decryption key to the device at a second point in time, wherein the issuer decryption key is not device-unique,
wherein the issuer decryption key is necessary for recovering the CEK from the rights object ciphertext, and the CEK is necessary for decrypting digital content associated with the content issuer,
wherein the first point in time is prior to a time of commencement of digital content delivery to the device; and
wherein the second point in time is coincident with the time of delivery of an initial part of digital content.

2. The method of claim 1, wherein providing the rights object ciphertext to the device comprises:
forwarding, by the rights issuer, the rights object ciphertext to the device.

3. The method of claim 2, wherein providing the issuer decryption key to the device comprises:
forwarding, by the content issuer, the issuer decryption key to the device.

4. The method of claim 1, wherein:
the integrity check information includes a key for rights object integrity protection.

5. The method of claim 3, comprising:
the device performing:
decrypting the rights object ciphertext using a private key associated with the device to produce a decrypted rights object ciphertext;
decrypting the decrypted rights object ciphertext using the issuer decryption key received from the content issuer to produce an encrypted CEK; and
decrypting the encrypted CEK using the private key associated with the device to obtain a CEK, whereby the CEK becomes available for decrypting digital content associated with the content issuer.

6. The method of claim 5, comprising:
receiving, at the device, digital content associated with the content issuer; and
decrypting the digital content using the CEK.

7. The method of claim 3, wherein the same issuer decryption key is forwarded to a plurality of devices.

8. The method of claim 3, wherein the issuer decryption key is forwarded to the device as an initial part of digital content associated with the content issuer.

9. The method of claim 6, wherein the issuer decryption key is forwarded to the device just prior to the device receiving the digital content associated with the content issuer.

10. The method of claim 3, wherein the issuer decryption key is digitally signed prior to being forwarded to the device.

11. The method of claim 5, wherein:
the integrity check information includes a key for rights object integrity protection.

12. A method for digital rights management at a device, comprising:
the device performing:
decrypting a rights object ciphertext received with a rights object from a rights issuer using a private key associated with the device to produce a decrypted rights object ciphertext and integrity check information;
decrypting the decrypted rights object ciphertext using an issuer decryption key received from a content issuer to produce an encrypted content encryption key (CEK), wherein the issuer decryption key is not device-unique; and
decrypting the encrypted CEK using the private key associated with the device to obtain a CEK, whereby the CEK becomes available for decrypting digital content associated with the content issuer
wherein the rights object ciphertext is available at the device at a first point in time and the issuer decryption key is available at the device at a second point in time,
wherein the issuer decryption key is necessary for recovering the CEK from the rights object ciphertext, and the CEK is necessary for decrypting digital content associated with the content issuer,
wherein the first point in time is prior to a time of commencement of digital content delivery to the device; and
wherein the second point in time is coincident with the time of delivery of an initial part of digital content.

13. The method of claim 12, comprising:
receiving digital content associated with the content issuer; and
decrypting the digital content using the CEK.

14. The method of claim 12, wherein the issuer decryption key is received at the device as an initial part of the digital content associated with the content issuer.

15. The method of claim 12, wherein the issuer decryption key is received at the device just prior to the device receiving the digital content associated with the content issuer.

16. A computer readable medium having stored thereon a set of one or more instructions for causing one or more processors to perform a method for digital rights management in a system supporting digital rights management that includes system components comprising a device, a content issuer, and a rights issuer, the method for digital rights management comprising:
at a system hardware component other than the device:
encrypting a content encryption key (CEK) using a public key associated with a device to produce an encrypted CEK;
encrypting the encrypted CEK using an issuer encryption key to produce a twice encrypted CEK, wherein the issuer encryption key includes data corresponding to the content issuer; and
producing a rights object ciphertext by encrypting the twice encrypted CEK and integrity check information using the public key associated with the device, wherein the integrity check information is for integrity checking a rights object;

providing the rights object ciphertext with the rights object to the device at a first point in time; and providing an issuer decryption key to the device at a second point in time, wherein the issuer decryption key is not device-unique, wherein the issuer decryption key is necessary for recovering the CEK from the rights object ciphertext, and the CEK is necessary for decrypting digital content associated with the content issuer, wherein the first point in time is prior to a time of commencement of digital content delivery to the device; and wherein the second point in time is coincident with the time of delivery of an initial part of digital content.

17. The computer readable medium of claim 16, wherein providing the rights object ciphertext to the device comprises:
forwarding, from the rights issuer, the rights object ciphertext to the device.

18. The computer readable medium of claim 17, wherein providing the issuer decryption key to the device comprises:
forwarding, from the content issuer, the issuer decryption key to the device.

19. The computer readable medium of claim 16, wherein:
the integrity check information includes a key for rights object integrity protection.

20. The computer readable medium of claim 18, wherein the method comprises:
the device performing:
decrypting the rights object ciphertext using a private key associated with the device to produce a decrypted rights object ciphertext;
decrypting the decrypted rights object ciphertext using the issuer decryption key to produce an encrypted CEK; and
decrypting the encrypted CEK using the private key associated with the device to obtain a CEK, whereby the CEK becomes available for decrypting digital content associated with the content issuer.

21. The computer readable medium of claim 20, wherein the method includes:
receiving, at the device, digital content associated with the content issuer; and
decrypting the digital content using the CEK.

22. The computer readable medium of claim 18, wherein the same issuer decryption key is forwarded to a plurality of devices.

23. The computer readable medium of claim 18, wherein the issuer decryption key is forwarded to the device as an initial part of digital content associated with the content issuer.

24. The computer readable medium of claim 18, wherein the issuer decryption key is forwarded to the device just prior to the device receiving the digital content associated with the content issuer.

25. The computer readable medium of claim 18, wherein the issuer decryption key is digitally signed prior to being forwarded to the device.

26. The computer readable medium of claim 20, wherein:
the integrity check information includes a key for rights object integrity protection.

27. A computer readable medium having stored thereon a set of one or more instructions for causing one or more processors to perform a method for digital rights management at a device, the method comprising:
the device performing:
decrypting a rights object ciphertext received with a rights object from a rights issuer using a private key associated with the apparatus to produce a decrypted rights object ciphertext and integrity check information;
decrypting the decrypted rights object ciphertext using an issuer decryption key received from a content issuer to produce an encrypted content encryption key (CEK), wherein the issuer decryption key is not device-unique; and
decrypting the encrypted CEK using the private key associated with the apparatus to obtain a CEK, whereby the CEK becomes available for decrypting digital content associated with the content issuer,
wherein the rights object ciphertext is available at the device at a first point in time and the issuer decryption key is available at the device at a second point in time,
wherein the issuer decryption key is necessary for recovering the CEK from the rights object ciphertext, and the CEK is necessary for decrypting digital content associated with the content issuer,
wherein the first point in time is prior to a time of commencement of digital content delivery to the device; and
wherein the second point in time is coincident with the time of delivery of an initial part of digital content.

28. The computer readable medium of claim 27, wherein the method comprises:
receiving digital content associated with the content issuer; and
decrypting the digital content using the CEK.

29. The computer readable medium of claim 27, wherein the issuer decryption key is received at the device as an initial part of the digital content associated with the content issuer.

30. The computer readable medium of claim 27, wherein the issuer decryption key is received at the device just prior to the device receiving the digital content associated with the content issuer.

* * * * *